United States Patent [19]

Kohl

[11] Patent Number: 4,682,985
[45] Date of Patent: Jul. 28, 1987

[54] GASIFICATION OF BLACK LIQUOR

[75] Inventor: Arthur L. Kohl, Woodland Hills, Calif.

[73] Assignee: Rockwell International Corporation, El Segundo, Calif.

[21] Appl. No.: 779,321

[22] Filed: Sep. 23, 1985

Related U.S. Application Data

[63] Continuation-in-part of Ser. No. 699,498, Feb. 8, 1985, which is a continuation of Ser. No. 486,274, Apr. 18, 1983, abandoned.

[51] Int. Cl.$^4$ ................................................. C10J 3/00
[52] U.S. Cl. ................................... 48/197 R; 48/203; 48/209; 162/30.11; 423/207; 423/DIG. 3
[58] Field of Search .................... 48/197 R, 203, 209; 162/30.1, 30.11; 423/207, DIG. 3; 60/39.02

[56] References Cited

U.S. PATENT DOCUMENTS

| | | | |
|---|---|---|---|
| 1,808,773 | 6/1931 | Grondona . | |
| 1,931,536 | 10/1933 | Goodell . | |
| 2,056,266 | 10/1936 | Goodell . | |
| 2,182,428 | 12/1939 | Fladmark | 159/48 |
| 3,639,111 | 2/1972 | Brink et al. | 48/111 |
| 3,718,446 | 2/1973 | Brink et al. | 48/209 |
| 3,916,617 | 11/1975 | McKenzie et al. | 60/39.02 |
| 4,441,959 | 4/1984 | Empie, Jr. | 162/30.1 |

*Primary Examiner*—Peter Kratz
*Attorney, Agent, or Firm*—H. Fredrick Hamann; Harry B. Field; Clark E. DeLarvin

[57] ABSTRACT

A concentrated aqueous black liquor containing carbonaceous material and alkali metal sulfur compounds is treated in a gasifier vessel containing a relatively shallow molten salt pool at its bottom to form a combustible gas and a sulfide-rich melt. The gasifier vessel, which is preferably pressurized, has a black liquor drying zone at its upper part, a black liquor solids gasification zone located below the drying zone, and a molten salt sulfur reduction zone which comprises the molten salt pool. A first portion of an oxygen-containing gas is introduced into the gas space in the gasification zone immediatley above the molten salt pool. The remainder of the oxygen-containing gas is introduced into the molten salt pool in an amount sufficient to cause gasification of carbonaceous material entering the pool from the gasification zone but not sufficient to create oxidizing conditions in the pool. The total amount of the oxygen-containing gas introduced both above the pool and into the pool constitutes between 25 and 55% of the amount required for complete combustion of the black liquor feed. A combustible gas is withdrawn from an upper portion of the drying zone, and a melt in which the sulfur content is predominantly in the form of alkali metal sulfide is withdrawn from the molten salt sulfur reduction zone.

7 Claims, 2 Drawing Figures

GASIFICATION OF BLACK LIQUOR

The Government has rights in this invention pursuant to subcontract STR/DOE-12 of Contract DE-AC05-80CS40341 awarded by the U.S. Department of Energy.

This application is a continuation-in-part of application Ser. No. 699,498 filed Feb. 8, 1985, which is a continuation of application 486,274 filed Apr. 18, 1983 and since abandoned.

BACKGROUND OF THE INVENTION

1. Field of the Invention

This invention relates to the gasification of black liquor. More particularly, this invention relates to an apparatus and process for controllably gasifying an aqueous black liquor by means of a molten salt to produce a combustible gas.

2. Prior Art

In the production of pulp and paper using the sodium-based sulfate and sulfite processes, digestion of wood with aqueous alkaline solutions results in the production of a byproduct which is known as spent or black liquor, hereinafter referred to as black liquor. In order to realize economies in the overall pulping process, this byproduct may not be disposed of as a waste material but instead must be converted into useful products. In particular, it is desired to regenerate sodium sulfide, which can be used to reconstitute active solutions for the pulp digestion step of the process. In addition, it is desirable to utilize the black liquor as an energy source.

The most widely practiced method of processing black liquor makes use of the Tomlinson recovery furnace (also referred to as the Tomlinson recovery boiler). In this system concentrated black liquor is burned in the furnace of a specially designed boiler to produce steam; a molten salt product generally referred to as "smelt" or "melt", which contains sodium carbonate and sodium sulfide; and non-combustible flue gas which, after suitable cleaning, is vented to the atmosphere. The process using the Tomlinson boiler has served the pulp and paper industry for about fifty years, yet it has serious deficiencies. The large volume of flue gas is difficult to clean and can constitute an environmental problem; all recovered energy is in the form of steam which has limited utility; explosions can occur if the boiler tubes leak and cause water to contact the smelt; and the reduction of sulfur compounds to sulfide is incomplete.

Various processes involing alternatives or improvements to the Tomlinson furnace have been used or proposed for converting black liquor to useful products.

U.S. Pat. No. 1,808,773 discloses a process which utilizes a black liquor recovery furnace having two zones of combustion. In the first high temperature combustion zone, black liquor sprayed into the furnace is dehydrated and substantially completely burned. In the second zone, located between the first zone and the bottom of the furnace, an additional quantity of black liquor is sprayed into the furnace along with sodium sulfate. In this second zone, water is removed from the black liquor by evaporation. Partial combustion of the black liquor results in the formation in the bottom of the furnace of a solid smelting bed of spongy carbon, mixed with alkali residues from black liquor and added sodium sulfate. Reducing conditions maintained in the bottom of the furnace result in the reduction of sulfate to sulfide. The molten salts trickle downward through the bed of spongy carbon and leave the furnace via a bottom drain. Although this process provides an alternative to use of the Tomlinson recovery boiler, the necessity for two discrete combustion zones requires a cumbersome apparatus. Also, the absence of any provision for heat recovery results in the loss of the heating value of the black liquor. Further, while there is conversion of sodium sulfate to sodium sulfide and the combustion of black liquor, the percentage of unconverted sulfate is relatively high, ranging from 8 to 12%.

U.S. Pat. No. 1,931,536 describes a process for controlling the zone of combustion of both sprayed black liquor and black liquor powder in a smelting furnace. An inert gas is introduced into the smelting furnace at or near the point of entrance of the sprayed black liquor or dried black liquor powder. This inert gas retards the combustion of the volatile constituents of the black liquor and permits the sprayed concentrated liquor or the dried black liquor powder to be projected into the smelting furnace for some distance before combustion of the organic and carbonaceous content of the black liquor occurs in a relatively deep bed in the smelting furnace. This process represents an improvement over the conventional Tomlinson recovery boiler but has the same basic limitations; the black liquor undergoes complete combustion to produce a large volume of impure flue gas, and only steam is produced.

U.S. Pat. No. 2,056,266 describes the use of a combined smelter and boiler, much like the Tomlinson boiler, for recovering alkali metal values from black liquor and utilizing the heat content thereof. Dried black liquor solids are fed to a solid fuel bed zone where they are burned in a reducing atmosphere with the result that partially burned gases rise from the fuel bed. These partially burned gases then are completely combusted by introducing a stream of air into a combustion zone above the bed. The combustion zone contains boiler tubes for the production of steam. Flue gases produced in the combustion zone are allowed to rise, and an inert gas is blown down on the fuel bed to prevent entrainment of solids in the gases rising from the fuel bed and to create a distinct line of separation between zones. Fused alkaline values are drained from the bottom of the bed. This process requires conversion of black liquor to black liquor solids prior to introduction into the fuel bed zone. In addition, the apparatus necessary for carrying out the process is complex and requires a separate means of drying black liquor.

U.S. Pat. No. 2,182,428 discloses a process for drying waste liquors by spraying the liquor to be evaporated upon the surface of a heat transfer medium such as oil, tar, pitch, asphalt or wax. Since the heat transfer medium is inert and no combustion or reduction reactions occur, the waste liquors are merely evaporated without recovering any useful product from the evaporated liquors.

U.S. Pat. Nos. 3,639,111 and 3,718,446 disclose a process for producing a clean-burning fuel by the high temperature distillation and pyrolysis of an organic material such as kraft black liquor. In order to achieve the required cracking temperatures in the pyrolysis zone, a controlled amount of an oxygen-containing gas (up to about 15% of that required for complete combustion) is introduced during the cracking operation. Because the oxygen-containing gas, pyrolyzing black liquor and product gases flow concurrently through the system and the product gas leaves at the full reaction temperature without giving up heat to incoming material, the process is thermally inefficient. Further, the requirements for both indirect heat exchange and direct combustion result in the need for relatively large complex equipment.

U.S. Pat. No. 3,916,617 describes the use of a molten salt to produce a low Btu gas from the gasification and partial oxidation of a carbonaceous material. Carbonaceous material is maintained in the molten salt zone in order to provide the desired reducing atmosphere when air is passed into this molten salt zone for partial combustion of the carbonaceous material. When air and black liquor are introduced into a molten salt reaction zone, the heat required to evaporate water in the black liquor must be supplied by combustion reactions. This results in the requirement for a high air/black liquor ratio and the production of low quality gas (typically less than 70 Btu/scf). As a result the process of this patent is primarily useful for gasification of coal and other relatively dry carbonaceous materials.

U.S. Pat. No. 4,441,959 discloses a process for recovering heat and chemical values from sent pulping liquors which utilizes a fluidized bed reaction chamber. A concentrated spent pulping liquor is combusted with air in a fluidized bed comprising a plurality of inert solid particulate materials, at least one of which is a finer particle size than another. Following combustion, the particulate materials of finer particle size are treated in an external fluidized bed heat exchanger to recover heat and to separate the finer particles from gaseous and solid products produced in the combustion. The solid products are thereafter subjected to treatment in a molten salt reducer, which results in the production of a smelt containing sodium sulfide and other salts. The gaseous products essentially comprise a noncombustible flue gas, the heat content of which is used to produce steam. The resulting cooled flue gas, following suitable purification, can be released to the atmosphere. Although this process recovers some of the heat and chemical values from spent pulping liquors, the solid combustion products are not reduced in the fluidized beds. Therefore a separate molten salt reducer is required, adding to the complexity of the process.

None of the processes previously available are therefore seen as being capable of conveniently and efficiently recovering substantially the entire energy and chemical content of black liquor as high value products.

While not considered part of the prior art, the present inventor and his associates have previously proposed other processes for the gasification of black liquor.

Thus it has been suggested that dried black liquor solids be gasified in a molten salt pool. In such a process, a combustible offgas is produced and a high level of reduction of the sulfur content of the black liquor solids to sulfide is realized. However, it is first necessary to dry the black liquor to form the black liquor solids required as feed to the molten salt pool. This increases the complexity and cost of the process.

In. U.S. patent application Ser. No. 667,937, filed Nov. 2, 1984, the present inventor has proposed a process for recovering the energy and chemical content of an aqueous black liquor by utilizing a reactor containing a drying zone located above a gasification zone. The reactor contains a bed of porous solid carbonaceous material in the gasification zone. An oxygen-containing gas is introduced into the gasification zone in a substoichiometric amount to produce partial combustion and gasification reactions sufficient to maintain the temperature at an upper surface of the bed of solid carbonaceous material in the gasification zone in the range of from about 870° to 1200° C. and to form a hot combustible gas which rises from the gasification zone. A concentrated black liquor containing alkali metal oxysulfur compounds is introduced into the drying zone, and the water contained therein is evaporated by contact with the hot gases rising from the gasification zone. In the drying zone there is produced a reduced-temperature product gas and dry black liquor solids which fall onto the surface of the bed in the gasification zone. The dried black liquid solids are converted into the hot combustible gas, which rises from the gasification zone, and alkali metal salts, which melt and permeate through the bed. The product gases are withdrawn from an upper portion of the drying zone. A melt in which the sulfur content is at least about 80% in the from of alkali metal sulfide is withdrawn from a lower portion of the gasification zone. Despite the advantageous features of this process in promoting gasification and sulfur reduction reactions, the reactions that occur are inefficient because of the relatively poor contact between the air and solid carbon. Also, operating characteristics are uncertain in that the bed of solid carbonaceous material can change height with minor fluctuations in operating conditions.

In U.S. patent application Ser. No. 699,498 filed Feb. 8, 1985, the present inventor has described the gasification of aqueous black liquor using a molten salt pool. An oxygen-containing gas is introduced beneath the surface of the molten salt pool, which comprises an alkali metal carbonate and an alkali metal sulfide contained within an enclosed gasifier vessel, at a rate sufficient to produce a high degree of turbulence in the molten salt pool. Black liquor in the form of a coarse spray is introduced into the rising hot gases above the pool. Thereby, water is evaporated from the aqueous black liquor into the hot gases to produce a reduced-temperature product gas and dried black liquor solids, which fall onto the surface of the pool and are dispersed therein. The dried black liquor solids are converted in the pool into a hot combustible gas, which rises out of the pool, and into alkali metal salts, which merge with the existing salts in the pool. A stream of product gas with a dry basis higher heating value (HHV) of at least about 90 Btu/scf is withdrawn from the gasifier vessel together with a molten salt product in which the sulfur content is at least about 90% in the from of alkali metal sulfide. Although the process of this invention is of utility in producing the desired results of providing a combustible gas and a molten salt product in which alkali metal sulfide predominates, the process is subject to certain problems. Corrosion and destruction of containment materials are generally inherent in the use of turbulent pools of molten salts. Also, entrainment of molten salts may occur in the gases rising out of the pool. This may require limiting the gas velocity through the pool. It has further been found that some of the carbonaceous matter in the black liquor is gasified before the articles reach the pool. As a result, only a portion of the carbonaceous matter enters the pool. If all of the air required for gasification of the black liquor is fed to the pool beneath its surface, conditions within the pool may be too strongly oxidizing for effective reduction of sulfur compounds to occur.

SUMMARY OF THE INVENTION

The present invention is a continuation-in-part of application Ser. No. 699,498 and constitutes an improvement over the invention shown therein as well as that disclosed in application Ser. No. 667,937. It retains the advantageous features of the basic black liquor gasification processes described in these two copending applications, while alleviating the above-mentioned problems. It provides the further significant advantage of permitting operation at a very high gasification rate for a given gasifier size.

In its broadest aspects, the invention comprises an improved apparatus and process for the gasification of black liquid in which a combustible gas is produced and the sulfur content of the black liquid is substantially completely converted to sulfide. An enclosed vertically elongated gasifier vessel has provision therein for maintaining in a sump at its bottom a relatively shallow pool of molten salt comprising an alkali metal carbonate and an alkali metal sulfide. Concentrated aqueous black liquor is sprayed into the vessel near its top. Means are provided for controllably feeding an oxygen-containing gas, preferably air, into the gasifier vessel at two distinct locations—one beneath the surface of the molten salt pool and the other above the melt surface into the lower portion of the gas space.

The distribution of the air feed into the gasifier is controlled so as to uniquely produce three zones in the gasifier vessel: (1) a black liquid drying zone located in the upper part of the vessel; (2) a black liquor solids gasification zone located below the drying zone; and (3) a molten salt sulfur reduction zone comprising the molten salt pool.

It is a key feature of this invention that the oxygen-containing gas, preferably air, is controllably fed both directly into the body of the molten salt pool (the sulfur reduction zone) and also above the surface of the pool into the lower portion of the gas space (the gasification zone). The distribution of the air feed is controlled so that only that amount of air is fed into the sulfur reduction zone in the molten salt pool which is required to assure complete destruction of the carbonaceous material which actually enters the melt pool. Typically, this represents about 30–70% of the total amount of air fed into the gasifier vessel. The balance of the air is fed into the gasification zone immediately above the pool. Thus, of the total amount of air fed to the gasifier vessel, about 30–70% of the total will be fed to the gasification zone. Since the purpose of the present process is to gasify the black liquor to produce a combustible gas, as well as to recover sulfur values, the total amount of air fed to the gasifier vessel will typically be about 25–55% of the amount required for complete combustion of the black liquor feed. Typically, the total air feed to the gasifier will be preheated to a temperature in the range of about 120°–450° C. (250°–840°F.), preferably 150°–400° C. (300°–750° F).

The combustible gas, whose combustible components are principally hydrogen and carbon monoxide, produced in the gasification zone can, after suitable cleanup, be used in a gas turbine in order to utilize the energy values of the black liquor feed to the maximum extent. The alkali metal sulfide produced in the molten salt pool can be recovered as an aqueous solution and recirculated to the papermaking process as green liquor.

DESCRIPTION OF THE PREFERRED EMBODIMENTS

Figure 1:
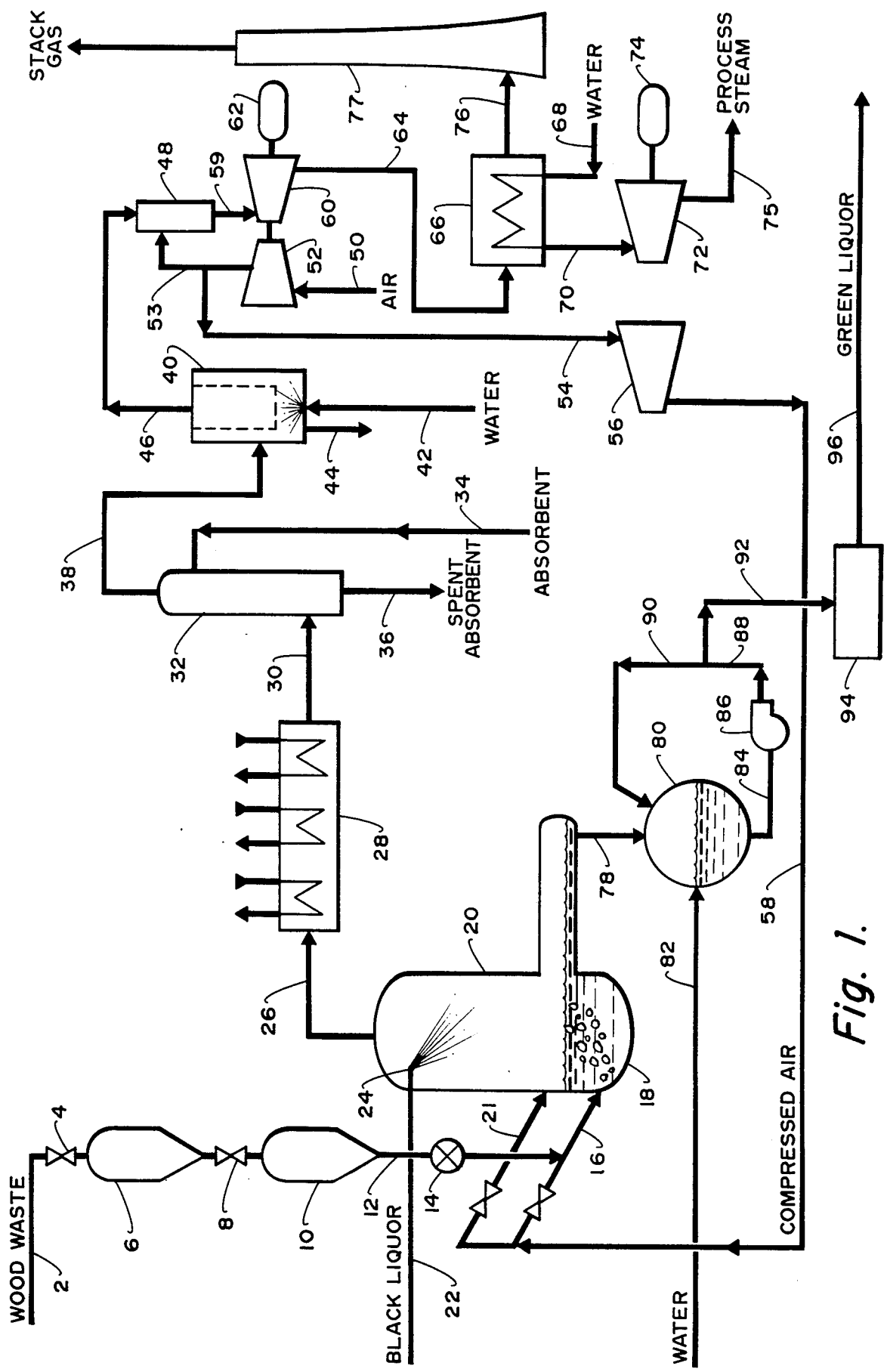
FIG. 1 is a schematic flow diagram illustrating a preferred embodiment of process of the present invention.

Black liquor, typically obtained from a wood-pulping operation as part of a papermaking process, contains combustible organic material, alkali metal sulfide and alkali metal hydroxide, as well as various alkali metal oxysulfur compounds. Typically, these oxysulfur compounds will be the sulfate, thiosulfate, and sulfite of sodium. The economics of the papermaking process required that substantially all of the combustible material be removed, the alkali metal and sulfur values be recovered from the black liquor, and the oxysulfur compounds be converted to alkali metal sulfide for return to the process without oxidation of the alkali metal sulfide initially present.

In practicing the present invention, a concentrated aqueous black liquor containing at least about 45% by weight solids and having a higher heating value (HHV) of at least about 3200 Btu/lb. is introduced into the drying zone, typically as a coarse spray. The drying zone provides direct-contact heat exchange between the falling drops of black liquor and the gas stream rising from the gasification zone. Water is evaporated from the concentrated black liquor due to the absorption of heat by convection from the rising gas stream. Heat is also supplied to the drops by radiation from high temperature components. Gas temperatures in this drying zone range from about 500° C. to about 800° C. near the top of the zone and from about 800° C. to about 1000° C. near the bottom.

Dried black liquor solids are formed in the drying zone as a result of the aqueous black liquor being contacted in the drying zone by the gases rising from the gasification zone. In the black liquor solids gasification zone, a significant portion of the carbonaceous material in the dried particles falling from the drying zone is converted to gas. The gas-producing reactions include pyrolysis with the release of volatile hydrocarbons, gasification of carbon with carbon dioxide and steam to produce carbon monoxide and hydrogen, and combustion of both gas and solid-phase components by reaction with the oxygen present in the oxygen-containing gas injected into this zone. As a result of the partial combustion reactions, heat is released to produce elevated temperatures in this zone in the range of 900°–1200° C. since the solid particles are subjected to reaction only for the relatively short time they are falling through the gasification zone, they are only partially gasified. Typically, 25–75% of the organic carbon present in the black liquor entering the gasifier vessel is gasified in the gasification zone. A similar or higher percentage of the organic hydrogen is also converted to gaseous components in this zone. The unreacted carbonaceous material, together with most of the inorganic material from the original black liquor feed, falls out of this zone into the sulfur reduction zone. The sulfur reduction zone comprises a pool of molten alkali metal salts contained in a shallow sump at the bottom of the gasifier vessel.

Essentially, all of the sulfur compounds present in the falling particles are reduced to sulfide in the molten salt sulfur reduction zone, or maintained as sulfides if they are already present in this form. Air is fed into this zone in an amount sufficient to provide the oxygen required to gasify all of the entering carbonaceous matter but significantly less than the amount required for complete combustion. Typically, the amount of oxygen required is in the range of 25-55% of that required for complete combustion of carbon to carbon dioxide, hydrogen to water, and sulfur compounds to the sulfate form. By providing only this amount of oxygen, conditions in the melt pool are highly reducing, and at least about 90% of the sulfur compounds in the product melt will be in the form of sulfide.

The present invention provides several significant advantages. Since only a portion of the carbonaceous material in the black liquor feed enters the molten salt pool and only a portion of the air is fed into the pool to react with it, the pool can be relatively shallow—typically 1 to 4 feet in depth. The use of a shallow pool reduces the amount of expensive melt-resistant refractory which must be used to line the gasifier. Another advantage of this invention is an increase in gasifier capacity. In a pool-type gasifier, the gas rate is normally limited by the problems of excessive entrainment and turbulence when the superficial velocity of gas leaving the pool exceeds 2-3 feet per second. This, in turn, limits the capacity of a given diameter gasifier. In the present invention only a portion of the gas passes through the pool. Thus, for example, if one-half of the gas passes through the pool at a superficial velocity at the surface of 2.5 feet per second and the other half is formed in the gasification zone, the total gas will enter the drying zone at a superficial velocity of about 5 feet per second, which is quite acceptable for gas/solid or gas/liquid reactors in which gas is the continuous phase. As a result, the capacity of a given diameter gasifier is greatly increased by incorporating this improvement in the invention covered by application Ser. No. 699,498.

As described in the two copending patent applications, heat losses from the reaction zones must be minimized. Thus operation at elevated pressure is preferred since this reduces the size of the gasifier vessels required thereby reducing heat loss as well as cost.

A typical system utilizing the molten salt gasifier vessel and the process of the present invention will now be described by reference to the drawing.

Referring to FIG. 1 of the drawing, there is shown a molten salt gasifier vessel used with a gas turbine combined cycle system representing a preferred embodiment of the present invention. Wood waste from any suitable source is introduced via a conduit 2 and a valve 4 into a lock hopper 6. From these the wood waste passes via a valve 8 into a second lock hopper 10. The lock hoppers are operated with a pressurizing gas in the conventional manner used to feed solids into a pressurized receiver. From lock hopper 10 the wood waste passes via conduit 12 and a feeder valve 14 to a valved conduit 16 through which compressed air is flowing. The wood waste is conveyed by the compressed air and injected together with it below the surface of a molten salt pool 18 contained in a sump in the bottom of a molten salt gasifier vessel 20. Air is also injected above the surface of the melt through a valved conduit 21. The amount of air fed into the melt via conduit 16 is typically 30-70% of the total air fed to the gasifier vessel. The amount of air fed to above the melt surface via conduit 21 represents the balance of 30-70% of the total.

Molten salt gasifier vessel 20, which uniquely enables practice of the process of the present invention, will be described in greater detail in connection with FIG. 2.

Referring again to FIG. 1, black liquor from a paper making process is sprayed into vessel 20 near the top of the vessel via a conduit 22 and a nozzle 24. The sprayed aqueous black liquor typically has a concentration of about 45-75% solids. The gaseous product from vessel 20 exits via a conduit 26 to a heat removal system 28, which may include a steam generator, and thereafter through a conduit 30 to an absorber 32. Absorbent is introduced into absorber 32 via a conduit 34. The absorbent may be an alkaline paper mill liquor or a conventional absorbent such as ethanolamine solution. This absorbent is used to remove $H_2S$ and other undesirable components from the gas. The absorber system used is preferably designed for selective absorption of $H_2S$ in the presence of $CO_2$ since the product gas contains significant quantities (10-15%) of $CO_2$. Spent absorbent exits absorber 32 via a conduit 36. Partially purified gases from absorber 32 are conducted via a conduit 38 to a fume scrubber 40 for further purification. Water is introduced into fume scrubber 40 through a conduit 42 and exits via a conduit 44. Scrubbed gases exit via a conduit 46 to a gas turbine combustor 48. The fume scrubber 40 is shown as a typical device for removing very fine particles of soluble salts. Other devices such as fabric filters may also be used for removing the fine particles. Air is supplied to combustor 48 via a conduit 50, a compressor 52 and a conduit 53. Air from compressor 52 is also fed via a conduit 54 to a booster compressor 56 and then to a compressed air line 58. This feeds conduits 16 and 21, which introduce air into and above the molten salt pool, respectively. Hot, clean combustion gases exit combuster 48 via a conduit 59 and are fed to a gas turbine 60, which powers a generator 62 and compressor 52. Expanding gases from gas turbine 60 are conducted via a conduit 64 to a waste heat boiler 66 into which water is introduced via a conduit 68 for conversion to steam. The steam produced in waste heat boiler 66 exits via a conduit 70 to a steam turbine 72, which powers a generator 74. Process steam is furnished from steam turbine 72 via a conduit 75. Exhaust gases from waste heat boiler 66 exist via a conduit 76 to a stack 77 for release to the atmosphere.

Overflow melt from vessel 20 flows via a conduit 78 into a quench tank 80. Water is introduced into quench tank 80 via a conduit 82. The aqueous solution resulting from quenching the melt is removed from quench tank 80 via a conduit 84, a pump 86 and a conduit 88. Part of the removed aqueous solution is recycled to quench tank 80 via a conduit 90 and serves to break up the falling stream of melt as it exits conduit 78. Another part of the solution is fed from conduit 88 via a conduit 92 to green liquor storage tank 94. A conduit 96 conducts the green liquor from storage tank 94 to an appropriate point in the papermaking process, for example, the causticizing stage of a sulfate (kraft) proces plant.

Figure 2:
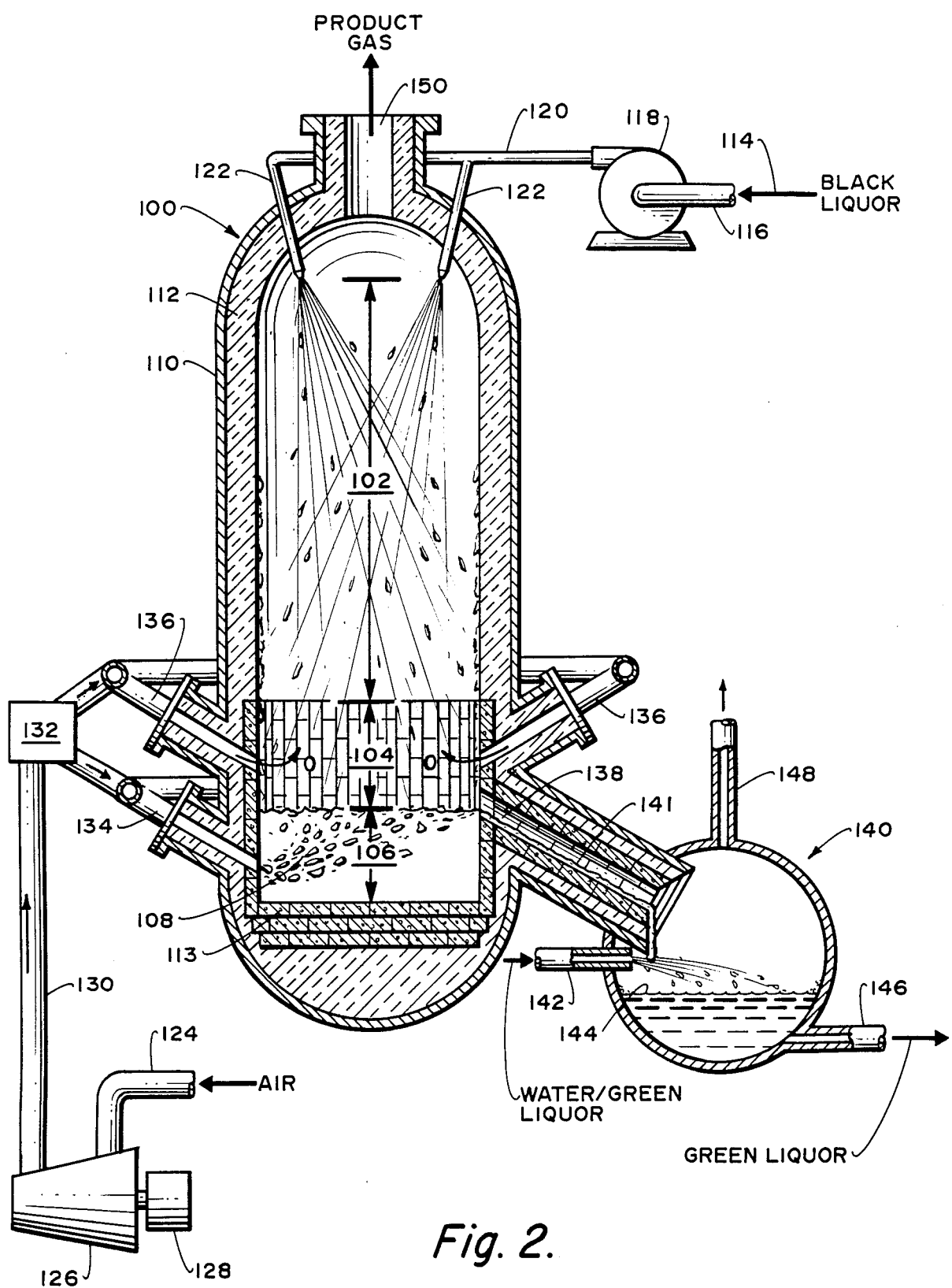
FIG. 2 is an elevational view partly in cross section of the gasifier vessel and associated quench tank of the present invention. These are utilized in carrying out the process of the present invention.

FIG. 2 describes the molten salt gasifier vessel of the present invention and the associated quench tank and their operation in greater detail. A gasifier vessel 100 contains a black liquor drying zone 102 located in the upper portion of the vessel, a black liquor solids gasification zone 104 located below the drying zone, and a sulfur reduction zone 106 comprising a molten salt pool 108 located in a sump at the bottom of the vessel. The vessel 100 is shown consisting of an outer wall metal containment shell 110 which is lined with an insulating refractory 112 capable of withstanding the temperatures and environment within the vessel 100. Insulating refractor material 112 is provided in sufficent thickness to minimize, to the extent practical, heat losses from within vessel 100. The molten salt pool 108 is further contained within a smelt-resistant refractory liner 113 which extends upward at least part way through the gasification zone 104.

A black liquor 114 to be treated is introduced (from a source not shown) through a conduit 116 to a pump 118. From pump 118 the black liquor is introduced into vessel 100 via a spray system 120 which injects the concentrated aqueous black liquor as a coarse spray via a plurality of spray nozzle 122 into an upper portion of drying zone 102.

A gas supply system for vessel 100 is provided which includes an inlet conduit 124 for an oxygen-containing gas (typically air) which leads into a compressor 126 driven by a motor 128. Advantageously, by compressing the oxygen-containing gas, the temperature of the gas is increased thereby. Alternatively, a gas heater may be used to raise the temperature of the oxygen-containing gas to the desired level. The pressurized oxygen-containing gas leaves compressor 126 via a conduit 130 to an air flow distribution control system 132 containing one or more proportioning valves. These serve to selectively control the flow of compressed air via a conduit 134 directly into reduction zone 106 (molten salt pool 108) and via a conduit 136 into the gasification zone above the molten salt pool. Conduits 134 and 136 generally constitute a circumferential array of gas injection ports for the respective feeding of the compressed air to the reduction zone 106 and gasification zone 104.

In accordance with a key feature of this invention, the distribution of the air feed is so controlled that only that amount of air required to assure destruction of the carbonaceous material actually entering the melt pool is fed into the molten salt reduction zone 106. This is typically 30-70% of the total amount of air air fed to vessel 100. The balance of the air fed to the vessel is fed into the gasification zone 104 immediately above the pool. Since a combustible gas is being produced, the total air fed to the vessel is typically 25-55% of the amount required for complete combustion of the total feed materials. As noted in FIG. 1, other material, such as wood waste, may be fed by means of compressed air directly into the molten salt pool.

An overflow melt outlet 138 leads into an enclosed quench tank 140. During normal operation, molten salt product melt 141 is discharged from pool 108 through melt outlet 138 into quench tank 140. Water or a suitable salt solution such as recycled green liquor is introduced into the quench tank 140 via a conduit 142. The water serves to shatter and quench the melt entering the quench tank to form a pool of green liquor 144 containing reduced chemical salts from the black liquor. The green liquor is withdrawn via a conduit 146, typically for return to a pulping process. A portion of the green liquor product may be recycled to conduit 142 for aid in breaking up melt 141. During the quenching of melt 141, there is produced a hot gas principally comprising water vapor which is withdrawn from quench tank 140 via a conduit 148. A minor portion of the gas produced in gasifier vessel 100 may be allowed to flow through melt outlet 138 together with the discharged melt, and this gas is also withdrawn from quench tank 140 via conduit 148. The total gas stream withdrawn from quench tank 140 through conduit 148 is preferably added to the main product gas stream by directing the gas in conduit 148 to an appropriate point in the product gas cooling and cleaning system, such as into conduit 30 of FIG. 1 or into the gas stream before its final cooling stage.

Referring back to vessel 100, the hot product gas is removed from the vessel via a gas outlet conduit 150 located in the upper end of the vessel above the drying zone. As noted in FIG. 1, the product gas exiting vessel 100 may be passed through a heat recovery system and thereafter through an absorber to remove $H_2S$ and other undesirable components from the gas. The heat removal system 28 in FIG. 1 may include a steam generator, feed water heater, or other heat-exchange means. Typically, the final stage of heat removal is accomplished by heat exchange with cooling water and results in the condensation of water vapor to form liquid water. This condensed water is preferably returned to quench tank 140 via conduit 142.

As noted in copending application Ser. No. 667,937, it may be advantageous to provide the gasifier vessel 100 with a burner assembly for providing a stream of hot gas into vessel 100 to preheat it prior to starting operation and optionally for providing an additional source of heat during operation. Also, as shown in FIG. 1, an acid gas-absorbing device 32 may be provided for providing contact between an absorbent and the product gas to remove noxious acid gases such as $H_2S$ and the like from the product gas so that it may be rendered suitable for use as a fuel for a gas turbine or other purposes.

Inasmuch as the operation of heaters, steam generators, condensers and absorbers are state-of-the-art, these associated components which are utilized with the black liquor gasification system need not be discussed in any detail.

It is desirable during operation of the process that a relatively constant temperature be maintained in gasification zone 104, for example 1000° C. in that part of the zone adjacent to the upper surface of molten salt pool 108. This can be accomplished by adjusting the air/black liquor ratio up or down to raise or lower the temperature as required to maintain the desired value. If other parameters such as black liquor composition, air preheat, and heat losses are not varied, this mode of operation will result in the production of a product gas of relatively constant composition and heating value. The product gas heating value can be increased, if desired, by introducing a high heating value fuel such as oil or petroleum coke into the gasification zone; increasing the temperature of the air feed; or reducing heat losses, by adding insulation, for example. A gaseous fuel such as natural gas or volatile hydrocarbons can, of course, be added directly to the product gas to raise its heating value.

The molten salt product melt 141 which flows out of vessel 100 to quench tank 140 is dissolved in water to form green liquor. It is advantageous to operate the quench tank at the same pressure as the gasifier to avoid the requirement for a pressure control valve operating on molten salt. The green liquor, which contains dissolved sodium sulfide, may be recycled to the pulping process or used for other purposes.

The gas rising from gasification zone 104 contains CO, $H_2$, $H_2O$, $CO_2$, $CH_4$ and, if air is used, $N_2$ plus various trace components and impurities nd is at a temperature in the range of about 870° to 1200° C. (1600° to 2200° F). Two impurities of special interest are $H_2S$, derived from sulfur in the black liquor feed, and fine particles of sodium salts, such as sodium carbonate and sodium sulfide, produced by vaporization and reaction phenomena. As the gas then passes through drying zone 102, it is cooled to a temperature in the range of about 350° to 850° C. depending upon its temperature entering the drying zone, the water content of the black liquor and related factors. Preferably the gas is cooled to a temperature at which the particles of sodium salts are solid, which is below about 790° C. for typical salt compositions.

As pointed out above, an oxygen-containing gas is controllably introduced into gasification zone 104 and reduction zone 106 of vessel 100 in order to cause partial oxidation of the carbonaceous material in the black liquor, generate the required high temperature, and produce the desired products. The oxygen-containing gas is suitably and preferably air; if desired, oxygen-enriched air or pure oxygen can be used. Although pure oxygen may be utilized in the process of this invention, it is less desirable than air or oxygen-enriched air because of the higher cost of oxygen and the requirement for locating an oxygen plant near the black liquor gasification system. In general, the upward velocity of the gas leaving the gasification zone should not exceed about 20 ft/sec and preferably should be in the range of 2 to 15 ft/sec.

The pressure within gasification vessel 100 should be within the range of about 1 to 50 atmospheres, with superatmospheric pressure particularly desired. Preferably a pressure of about 3 to 30 atmospheres should be used. The use of superatmospheric pressure is desirable for a number of reasons. Safety of the process is enhanced by the use of superatmospheric pressure because explosions which may occur when mixing melt and water in the process of quenching the melt are inhibited by increased pressure. The product gas volume and consequently the size of the equipment necessary for conducting the process is reduced by a factor of as much as about 20:1 when superatmospheric pressures are used. This reduces both cost and heat losses. In addition, salt vaporization is reduced, eliminating the necessity for extensive cleanup of the gas produced in the process. The removal of vapor-phase impurities such as hydrogen sulfide from the product gas by use of absorption or adsorption processes is facilitated by increased pressure. Another advantage of operating the process under pressure is increased thermal efficiency of the process due to partial recovery of melt thermal energy which is made possible by the increase in boiling point of the quench tank solution as the pressure is increased. Another advantage is that the product gas is available at the pressure required for use in subsequent operations, such as at the inlet to a gas turbine.

Temperatures in the gasification zone 104 adjacent the upper surface of the molten salt pool 108 are maintained in the range of about 870°–1200° C. (1600°–2200° F.) and preferably in the range of about 900°–1070° C. (1650°–1950° F). If should be noted that the gasification zone does not operate at a completely uniform temperature. The highest temperature in this zone is normally near the surface of the molten salt pool where injected oxygen reacts with carbonaceous material. Temperatures near the top of the gasification zone decrease as the gas approaches the drying zone.

The high-temperature gases rising from the gasification zone are cooled to a temperature of about 350° to 850° C. during passage through the drying zone. This cooling effect represents an additional benefit of this invention in that it causes droplets of molten salt which might be entrained in the rising gas to be solidified before leaving the reactor. The resulting solid particles do not adhere to or corrode heat transfer surfaces and other equipment in the product gas processing system. Temperatures in the molten salt pool reduction zone may be somewhat lower than those in the gasification zone due to the endothermic sulfur reduction reactions occurring in the reduction zone. However, temperatures in the reduction zone must be maintained at a sufficiently high level to assure that solidification of the salts does not occur and the reduction reactions can proceed at a high rate. A range of about 860°–1100° C. (1580°–2000° F.) is useful, and the preferred range is about 870°–1050° C. (1600°–1920° F.) for the molten salt pool reduction zone.

It is very important that heat be retained within the gasification and reduction zones. Otherwise heat losses will require a higher air-to-black liquor feed ratio to maintain temperature. As the air-to-black liquor ratio is increased, more complete combustion occurs, particularly the high exothermic reactions to $CO_2$ and $H_2O$ from CO and $H_2$. This compensates for heat losses but reduces the heating value of the product gas. It is somewhat less important that heat losses be minimized from the drying zone because heat losses from this zone act primarily to reduce the temperature but not the heating value of the product gas. Heat losses from all three zones are reduced by the use of insulating material 112. Any convenient insulation can be used for this purpose. For example, insulating blankets, castable refractory, fire brik, fiberglass and tile are suitable. Materials which are in contact with high temperature molten salt and salt vapors must be resistant to attack by these agents. High purity fusion cast alumina blocks for example have been found to be quite effective for use as smelt resistant refractory liner 113.

The control of heat losses is an important feature of the present invention and is in sharp contrast to the practices utilizing the Tomlinson boiler or an equivalent thereof in which the heat produced in the combustion of black liquor is used to convert water to steam in boiler tubes present in the reactor. Rather than removing heat in this manner, in order to produce combustible gas product having the desired higher heating value, it has been found essential to prevent the heat from being lost. In particular, where it is desired to have a higher heating value (HHV) for the product gas of at least about 90 Btu/scf, it is necessary to design the system so that the total heat loss from the gasification and reduction zones is less than about 600 Btu per pound of black liquor feed and preferably less than 500 Btu/lb.

In order to limit heat loss from these zones by radiation upward into the cooler drying zone, it is desirable that the cross sectional area of the vessel at the top of the gasification zone be limited. For example, a cross sectional area less than about 0.009 ft$^2$/lb/hr of black liquor feed will limit radiation losses to less than about 500 Btu/lb of black liquor for typical operating conditions. Since some heat losses by conduction through the walls and floor of the vessel can also be expected, a cross sectional area less than about 0.008 ft$^2$/lb/hr of black liquor feed is ordinarily required. Thus, a commercial unit to handle 100 tons/day of black liquor feed (8333 lb/hr) would require a cross sectional area at the top of the gasification zone less than 66.7 ft², or an inside diameter less than about 9 ft for a circular cross-section. Even smaller cross sectional areas are preferred (e.g., less than about 0.006 ft²/lb/hr) and can conveniently be attained with accepable gas velocities by operating at elevated pressures. Reducing the cross sectional area necessarily results in an increase in gas velocity in the gasifier if other conditions are not changed. Thus in order to avoid excessive velocities while operating with a cross sectional area in the preferred range it is desirable to operate the gasifier at an elevated pressure.

The heat loss or heat removal referred to in the above discussion refers only to heat which leaves the gasification and reduction zones by radiation upward or conduction into or through the walls and which is therefore controllable by proper system design. In addition, it is important that the black liquor be almost completely dried before it enters the gasification zone so that heat will not be consumed evaporating water, and that the air feed to both of the lower zones be preheated to minimize the heat required to raise its temperature. Certain heat losses are unavoidable, however, and set an upper limit of about 75% on the heating value of the black liquor that can be converted to product gas heating value. The unavoidable heat losses include sensible heat in the product gas and product melt and the heating value of sulfide in the melt.

In order to achieve the desired gasification of aqueous black liquor in the process of the present invention, aqueous black liquor is introduced into drying zone 102 of vessel 100 in a manner that provides an adequate area of black liquor surface in direct contact with the rising stream of hot gas and an adequate contact time. The black liquor may be sprayed into the vessel to form falling drops which are dried by the gases rising from the gasification zone, with the water being vaporized from the black liquor before the black liquor leaves the drying zone. Spray drops may also strike the inner walls of the vessel in the drying zone where they adhere and are dried to form deposits of carbonaceous material and salts which subsequently fall from the walls into the gasification and reduction zone. However, it is not desirable to introduce the black liquor in so fine a spray that the spray droplets or the resultant dried, finely divided black liquor solids are entrained in the hot gases rising through the gasifier vessel. The coarseness of the spray is adjusted so that adequate drying with minimum entrainment occurs.

The gas produced as a result of the gasification of the black liquor solids has a dry basis higher heating value of at least about 90 Btu/scf primarily due to the presence of CO, $H_2$ and $CH_4$. As the product gas rises through the black liquor drying zone, its water vapor content increases and its temperature decreases as a result of evaporation of water from the black liquor. In addition, the increase in water vapor causes the water gas shift reaction to occur as follows:

$$CO + H_2O = CO_2 + H_2.$$
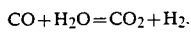

This results in a change in gas composition so that the gas leaving the top of the drying zone contains less CO and more $H_2$ than that leaving the gasification zone. However, the higher heating value is not materially changed by the reaction.

Gas leaving the drying zone may be processed in a number of ways. Preferably, its sensible heat is utilized for the production of steam in a steam generator or other heating service. For most applications, it is desirable to remove water vapor, fine salt particles, and $H_2$ from the gas before it is used. These steps may be accomplished in conventional equipment such as a condenser to remove water vapor, absorption contactors employing alkaline solutions to absorb $H_2S$, and fume scrubbers or fabric filters to remove particulate matter. The water, salt, and sulfur recovered in such steps can be recycled to the pulp mill or gasification process. In some cases it may be desirable to purify the product gas as it leaves the gasifier without further cooling so that the sensible heat and compression energy in the gas and in the water vapor may be utilized in a gas turbine or other energy conversion system.

As pointed out, the discharged melt 141 flows from vessel 100 via conduit 138 into quench tank 140 where it is dissolved in water at gasifier pressure. The melt will solidify and block the flow path if it is permitted to cool below about 760° C. (1400° F.) while in contact with the discharge nozzle. It is therefore desirable to allow a portion of the high temperature as from the gasification zone to flow through the melt discharge line to help maintain a high temperature in this line. This gas will flow into quench tank 140 from which it can be vented to the product gas system at a point downstream of the gasifier. Other means may be used to maintain a clear path for melt flow including auxiliary burners and mechanical breaker systems.

The followings example are illustrative of this invention but are not intended to restrict the scope thereof.

EXAMPLES

The basic process chemistry involved in the molten salt gasification of concentrated aqueous black liquor was previously demonstrated by the present inventor in a series of bench-scale tests. These were conducted in a six-inch ID bench-scale gasifier installed with an electric furnace that could be operated to minimize heat losses through the walls. Product gas higher heating values (HHV, dry bsis) ranged from about 120 to 140 Btu/scf depending on the black liquor composition and other variables. Sulfur recovered from the melt was generally over 90% in the form of sodium sulfide. The effects of pressure on the basic chemistry were also previously demonstrated by test programs.

To further demonstrate the commercial potential of the molten salt black liquor gasification process, a multipurpose molten salt test facility (MSTF) was modified to provide a black liquor gasifier vessel capable of demonstrating the present process at a pilot plant level. The modification provided a three-zone gasification vessel consisting of an aqueous black liquor drying zone, a black liquor solids gasification zone, and a molten salt sulfur reduction zone. The MSTF used consists of a vessel of about 33 inch ID by about 167 inch inside height. The lower 96-inch section is lined with fused cast alumina bricks about 6 inches thick, which are backed by about a half inch of high alumina castable refractory. These materials are highly resistant to attack by the high temperature molten salt, but are not effective as thermal insulation. To reduce heat losses from the gasification and reduction zones, a ⅛ inch thick layer of mineral fiber insulating paper was installed on the outside of the metal vessel; however, a more effective thicker layer could not be used without causing the allowable temperature of the metal vessel to be exceeded.

In prior testing and analytical studies of black liquor gasification, the preesnt inventor had demonstrated that a key requirement for producing a combustible gas having an HHV greater than 100 Btu/scf and melt reduction greater than 90% reduction to sulfide required that heat lost from the combined gasification and reduction zones should preferably be less than about 500 Btu/lb feed for a typical black liquor composition. Since the original purpose of the MSTF vessel was to test chemical waste disposal by complete combustion, in order to maximize throughput the unit was designed to permit a very high rate of heat loss through the walls (about 600,000–800,000 Btu/h). Accordingly, because of the original high heat loss dsign of the MST vessel, the key objectives of the black liquor gasification program at the pilot plant level was limited to demonstrating the operability of relatively large-scale equipment and establishing the predictability of performance based on bench scale tests and analytical studies.

Two key structural modifications were made in the MSTF vessel in accordance with the present invention. The melt removal port located 76 inches above the floor of the vessel was plugged with a ceramic insert and covered with a blanking flange. A new melt overflow spout was designed and fabricated for the test operation and installed 14 inches above the vessel floor. By lowering the melt removal port, melt inventory was reduced and relatively shallow pool was provided.

In addition to the four existing nozzles used for air injection into the molten salt pool, six new nozzles were provided at an elevation of 20 inches above the vessel floor so as to permit a portion of the injected air to be injected above the melt pool. These newly provided nozzles were evenly spaced around the circumference of the vessel and pointed down and inward at a 45° angle so that the air was directed toward the surface of the molten salt pool. Balancing orifices were used at each nozzle to provide an even air distribution to individual air ports. Changes were also made to the black liquor injection system aimed at increasing and maintaining the black liquor flow.

The total run time consisted of about 46 hours of operation from the initial black liquor feeding to system shut-down and included 14 tests. About 19,000 lbs of black liquor were gasified; however, black liquor flow was not continuous during the entire run.

The gasifier was started up by first setting the air flows to the nominal values for full load conditions, e.g., for a nominal superficial gas velocity of five fps at 980° C. (1800° F.). The total air distribution to the gasifier vessel was initially set to provide about 40% of the air to the top six nozzles (above the melt) and 60% of the air to the bottom four nozzles (into the melt). However, this ratio was reversed for tests 10 through 14. The upper six nozzles received preheated air; the bottom four nozzles received ambient temperature air. A temporary natural gas burner was installed on the vessel head for preheating the unit. The gasifier ws preheated to 930°–980° C. (1700°–1800° F.) prior to the run. Table 1 shows an analysis of the black liquor used in the tests.

Analysis of the test results showed that the product gas had a maximum HHV, dry, of 52.3 Btu/scf during steady-state operation and a maximum reduction of sulfur in the melt of 67.4%. As noted, because of the design of the MSTF vessel, it was not feasible to increase these values significantly during the run by changes which would permit operation at a lower air/fuel ratio such as by providing additional insulation to the vessel or by increasing the black liquor feed rate.

Tests 10 and 13 (see Table 2) are typical examples of the performance of the MSTF in the configuration of this invention. For comparison, the results of a previous test, designated as test A, with a different configuration are included in the table. During this previous test, all of the air was fed beneath the surface of a deep molten salt pool.

TABLE 1

ANALYSIS OF BLACK LIQUOR USED IN MSTF RUN

|  | Wet Basis | Dry Basis |
|---|---|---|
| Solids concentration, wt. % | 66.47 | 100.0 |
| pH | 12.8 | — |
| Density g/cm$^3$ @ 25° C. | 1.41 | — |
| Heat of Combustion, Btu/lb | 4311 | 6485 |
| Element analysis, wt % |  |  |
| Carbon[a] | 24.80 | 37.31 |
| Hydrogen[a] | 2.27[b] | 3.41 |
| Organic carbon | 25.46 | 38.30 |
| Sodium | 13.90 | 20.91 |
| Potassium | 1.24 | 1.87 |
| Calcium | 0.02 | 0.03 |
| Magnesium | 0.01 | 0.02 |
| Iron | 0.01 | 0.01 |
| Aluminum | <0.01 | <0.01 |
| Total sulfur | 2.71 | 4.07 |
| Elemental sulfur | 0.08 | 0.12 |
| Polysulfide sulfur | 0.05 | 0.07 |
| Compounds, wt. % |  |  |
| NaOH | 0.37 | 0.55 |
| Na$_2$S | 4.11 | 6.18 |
| Na$_2$CO$_3$ | 4.63 | 6.97 |
| Na$_2$SO$_4$ | 2.68 | 4.03 |
| Na$_2$SO$_3$ | 0.01 | 0.01 |
| Na$_2$S$_2$O$_3$ | 1.38 | 2.07 |
| NaCl | 0.09 | 0.14 |
| Na$_2$C$_2$O$_4$ | 0.93 | 1.40 |
| Methoxyl (O—CH$_3$) | 3.16 | 4.76 |
| Tall oil | 0.56 | 0.85 |
| Volatile acids | 7.06 | 10.62 |

[a]Sample dried before analysis; may have lost volatile organics.
[b]Does not include hydrogen in water.

TABLE 2

MSTF TEST RESULTS

|  | Run Nos. | | |
|---|---|---|---|
|  | 10 | 13 | A |
| Melt Pool Depth, inches | 14 | 14 | 76 |
| Air Distribution, % |  |  |  |
| into melt pool | 37 | 37 | 100 |
| above pool surface | 63 | 63 | 0 |
| Black Liquor Feed, lb/h | 844 | 674 | 530 |
| Air Feed, lb/h | 1469 | 1426 | 1180 |
| Air/Black Liquor wt ratio | 1.74 | 2.12 | 2.23 |
| Temperatures, °C. (°F.) |  |  |  |
| melt pool | 886 (1627) | 964 (1767) | 993 (1820) |
| feed air | 230 (446) | 231 (448) | 462 (864) |
| black liquor | 102 (216) | 94 (201) | 77 (170) |
| Product Gas Analyses, vol % dry |  |  |  |
| H$_2$ | 7.7 | 5.0 | 4.8 |
| CO$_2$ | 17.3 | 16.3 | 16.4 |
| Ar | 0.8 | 0.9 | 0.9 |
| N$_2$ | 67.2 | 73.3 | 74.3 |
| CH$_4$ | 0.6 | 0.3 | 0.5 |
| CO | 6.4 | 4.3 | 3.2 |
| Product Gas HHV, Btu/scf | 52.3 | 33.0 | 31.5 |
| Melt Composition, wt % |  |  |  |
| Na$_2$CO$_3$ | 68.4 | 75.3 | 74.0 |
| Na$_2$S | 16.6 | 8.9 | 0.2 |
| Na$_2$SO$_3$ | 0.7 | 1.1 | 0.1 |
| Na$_2$SO$_4$ | 14.3 | 28.1 | 25.7 |

TABLE 2-continued
MSTF TEST RESULTS

| | Run Nos. | | |
|---|---|---|---|
| | 10 | 13 | A |
| Reduction Efficiency, % | 67.4 | 38.6 | 1.4 |

A comparison of tests and 13 and A, which operated at approximately the same air/black liquor ratio, indicates that reducing the melt pool depth from 76 to 14 inches had no adverse effect on the product gas heating value. The sulfur reduction efficiency is seen to be significantly higher in both tests 10 and 13 than in test A. This is attributed to the divided air feed arrangement for tests 10 and 13 whereby only 37% of the air passed through the melt pool, with the balance injected into the gasification zone. This arrangement also permitted more total air (and therefore more black liquor) to be fed into the gasifier during tests 10 and 13 without excessive entrainment of melt droplets. As a result the unit could be operated at a lower air/black liquor ratio during test 1 to product a higher heating value gas than possible with the configuration used for test A.

Test 10 represents the maximum steady-state operating capability of the MSTF in the final configuration with regard to throughput, product gas heating value, and sulfur reduction. The throughput is limited by the allowable gas velocity and could be increased by increasing the operating pressure or, to a lesser extent, by operating with a lower air/black liquor feed ratio. The product gas heating value and sulfur reduction efficiency could also be increased by operating with a lower air/black liquor ratio; however this mode of operation would cause the system temperature to drop unless the heat loss per pound of feed is reduced. This can be accomplished by either reducing the total heat loss (e.g., by the use of additional insulation) or by increasing the allowable feed rate (e.g. by increasing the pressure).

At conditions obtainable in the MSTF vessel, the results indicate that operation with a significant portion (30-70%) of the air injected above the pool of molten salt results in more efficient sulfur reduction than operation with 100% of the air injected beneath the pool surface and also permits operation at a higher gas production rate. The results also show that a very shallow pool of melt (nominal depth about 14 inches) is as effective for black liquor gasification as a deep pool (76 inches).

The present tests, compared with previous tests at both the bench scale and pilot scale level, demonstrate that decreasing the air to black liquor ratio results in an increase in both the product gas HHV and the melt sulfur reduction efficiency. The data indicate that a sulfur-reduction efficiency of over 90% will be obtained when the air/black liquor ratio is decreased to the point where the gas HHV exceeds about 60 Btu/scf. This enables projection of the pilot-scale results to indicate that commercial plants will operate to produce gas with an HHV over 100 Btu/scf and melt in which the sulfur content is over 90% in the form of sulfide.

It will be recognized that the kraft pulp production process is about 100 years old. Because the chemicals used in the cooking liquor composition for the treatment of the cellulosic raw material are too expensive to discard, from the inception of the kraft process many attempts have been made to recover these cooking materials, with incidental recovery of heat through burning liquor organic matter dissolved from wood. The Tomlinson boiler was introduced about 50 years ago to accomplish the desired recovery. Because of the previously mentioned disadvantages of the Tomlinson boiler, many modifications and replacements for it have been proposed. The present process avoids the disadvantages of other proposed processes in that it uses the identical concentrated black liquor feedstock without the requirement to predry, oxidize, hydrolyze or otherwise prepare the feedstock. Also, the present process produces a smelt which is essentially identical to that produced by the Tomlinson boiler. Because of the above advantageous features, as well as a its use of a single component vessel, the present process can be readily integrated into existing pump mill systems to replace or supplement Tomlinson boilers.

It will be realized that various modifications utilizing the long-standing teachings in the black liquor recovery field can be made to the design of the vessel and the operation of the process of this invention without departing from the spirit thereof. For example, the vessel may be designed with a smaller diameter in the drying zone than in the gasification and reduction zones in order to reduce thermal radiation from these latter zones. Also, other gasifier vessel shapes may be used instead of the constant diameter vertically elongated walls shown. Further, the black liquor feed may be broken up by a spinning disk atomizer, steam atomizer, or flow distribution system instead of spray nozzles as illustrated. Thus, while the principle, preferred design and mode of operation of the invention have been explained and what is now considered to represent its best embodiment has been illustrated and described, it should be understood that, within the scope of the appended claims, the invention can be practiced otherwise than as specifically illustrated and described.

What is claimed and desired to be secured by Letters Patent of the United States is:

1. A process for treating a concentrated aqueous black liquor carbonaceous material and alkali metal sulfur compounds to form a combustible gas and a sulfide-rich melt comprising:
   (a) providing a gasifier vessel maintained at a pressure of from about 1 to 50 atmospheres and containing a relatively shallow molten salt pool at its bottom within a sump equipped with an overflow discharge, said vessel having
      (I) a black liquor drying zone at its upper parts,
      (ii) a black liquor solids gasification zone located below the drying zone, and
      (iii) a molten salt sulfur reduction zone comprising said molten salt pool;
   (b) introducing into the top of said drying zone the concentrated aqueous black liquor containing carbonaceous material and alkali metal sulfur compounds;
   (c) evaporating water from said concentrated aqueous black liquor in said drying zone by direct contact of said aqueous black liquor with the hot gas rising from the gasification zone to produce dried black liquor solids, which fall into said gasification zone, and a cooled combustible gas container water vapor said combustible gas being at a temperature below the melting point of entrained droplets of the molten salt causing solification of said droplets;

(d) introducing a first portion of an oxygen-containing gas into the gas space in the gasification zone located below the drying zone immediately above the molten salt pool to partially oxidize and gasify a fraction of the carbonaceous material in said dried black liquor solids falling through said zone to form a hot combustible gas;

(e) introducing a second portion of said oxygen-containing gas beneath the surface of said molten salt pool in an amount sufficient to cause gasification of essentially all carbonaceous material entering the pool from the gasification zone but not sufficent to create oxidizing conditions in the pool, the formed gas rising from said pool, the total amount of said first and second portion of oxygen-containing gas constituting between 25 and 55% of the amount of oxygen-containing gas required for complete combustion of the black liquor feed and representing the total amount of oxygen-containing gas fed to said gasifier vessel;

(f) withdrawing said cooled combustible gas having a higher heating value of at least about 90 Btu/scf (dry basis) from an upper portion of said drying zone; and (g) withdrawing from said overflow discharge in the molten salt reduction zone a melt in which the sulfur content is predominantly in the form of alkali metal sulfide.

2. The process of claim 1 wherein each of said first and second portions of the oxygen-containing gas constitutes from 30 to 70% of the total amount of oxygen-containing gas fed to the vessel.

3. The process claim 2 wherein said oxygen-containing gas comprises air.

4. The process of claim 1 wherein said gasifier vessel is maintained at a pressure in the range of from about 3 to 30 atmospheres and wherein the concentrated aqueous black liquor fed to the vessel comprises at least 45 wt % solids and has a higher heating value of at least about 3200 Btu/lb.

5. The process of claim 1 wherein the hot gas leaving the gasification zone is at a temperature of 870°–1200° C. and the cooled combustible gas leaving the drying zone is at a temperature of 350°–850° C.

6. The process of claim 1 wherein the temperature in the reduction zone is 860°–1100° C.

7. The process of claim 1 wherein the total heat loss from said gasification and reduction zone is less than about 600 Btu per pound of black liquor fed to the gasifier vessel.

* * * * *

UNITED STATES PATENT AND TRADEMARK OFFICE
CERTIFICATE OF CORRECTION

PATENT NO. : 4,682,985
DATED : Jul. 28, 1987
INVENTOR(S) : Arthur L. Kohl

It is certified that error appears in the above-identified patent and that said Letters Patent is hereby corrected as shown below:

In the ABSTRACT, line 11 correct "immediatley" to read --immediately--.

Col. 18, line 41 after "liquor" insert --containing--;

line 49 change "(I)" to --(i)--;

line 49 change "parts" to read --part--;

lines 64, 65 change "container" to read --containing--.

Col. 19, line 15 change "portion" to read --portions--.

Signed and Sealed this

Fifteenth Day of December, 1987

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,682,985

DATED : Jul. 28, 1987

INVENTOR(S) : Arthur L. Kohl

It is certified that error appears in the above-identified patent and that said Letters Patent is hereby corrected as shown below:

Col. 3, line 22, change "sent" to read --spent--.

Col. 4, line 62, change "articles" to read -- particles--.

Col. 14, line 2, change "H2" to read --$H_2S$--;

line 21, change "as" to read --gas--.

Col. 18, line 13, delete "a"; (1st occurrence)

line 15, change "pump" to read --pulp--.

Signed and Sealed this

Twenty-sixth Day of January, 1988

Attest:

DONALD J. QUIGG

Attesting Officer

Commissioner of Patents and Trademarks